United States Patent
Kopp

(10) Patent No.: US 7,107,856 B2
(45) Date of Patent: Sep. 19, 2006

(54) SENSOR, SPECIFICALLY A PRESSURE SENSOR TO BE FASTENED TO A RECEPTACLE

(75) Inventor: Thomas Kopp, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/830,970

(22) Filed: Apr. 22, 2004

(65) Prior Publication Data
US 2005/0145035 A1    Jul. 7, 2005

(30) Foreign Application Priority Data
Apr. 24, 2003   (DE)   ................. 103 18 678

(51) Int. Cl.
*G01L 7/00* (2006.01)
(52) U.S. Cl. ....................................... 73/756
(58) Field of Classification Search ............. 73/700, 73/756
See application file for complete search history.

(56) References Cited

U.S. PATENT DOCUMENTS

| 5,665,921 | A  | * | 9/1997 | Gerst et al. .............. 73/715 |
| 6,209,399 | B1 | * | 4/2001 | Probst et al. ............ 73/756 |
| 6,508,131 | B1 | * | 1/2003 | Frick ....................... 73/756 |
| 2001/0013254 | A1 | * | 8/2001 | Werner et al. ........... 73/700 |

FOREIGN PATENT DOCUMENTS

| DE | 101 33 066 A1 | 1/2003 |
| EP | 0 317 163 | 5/1989 |
| EP | 0 352 240 | 1/1990 |
| EP | 0 723 143 A1 | 7/1996 |
| EP | 0 780 674 A1 | 6/1997 |
| EP | 0 984 258 A2 | 3/2000 |
| EP | 1 070 948 A1 | 1/2001 |
| EP | 1 098 183 A2 | 5/2001 |
| WO | WO 03/036252 A2 | 5/2003 |

* cited by examiner

*Primary Examiner*—Edward Lefkowitz
*Assistant Examiner*—Andre Allen
(74) *Attorney, Agent, or Firm*—Nath & Associates PLLC; Gregory B. Kang; Teresa M. Arroyo

(57) ABSTRACT

The invention relates to a pressure sensor (2) with a housing (20, 22), a front-end sensor device (24), and a sensor-fastening device (25, 26, 27, 28) for fastening the sensor device (24) to and/or in the housing (20, 22). An advantageous ratio of the diameter ($d_S$) of the sensor device (24) relative to the housing-fastening device (23) is achieved inasmuch as the sensor-fastening device (25, 26) encompasses and provides support to the sensor device (34) from the front end outwards, at least in the section of the front end rim area, and is attached by a joint to the housing.

15 Claims, 1 Drawing Sheet

SENSOR, SPECIFICALLY A PRESSURE SENSOR TO BE FASTENED TO A RECEPTACLE

Figure 1:
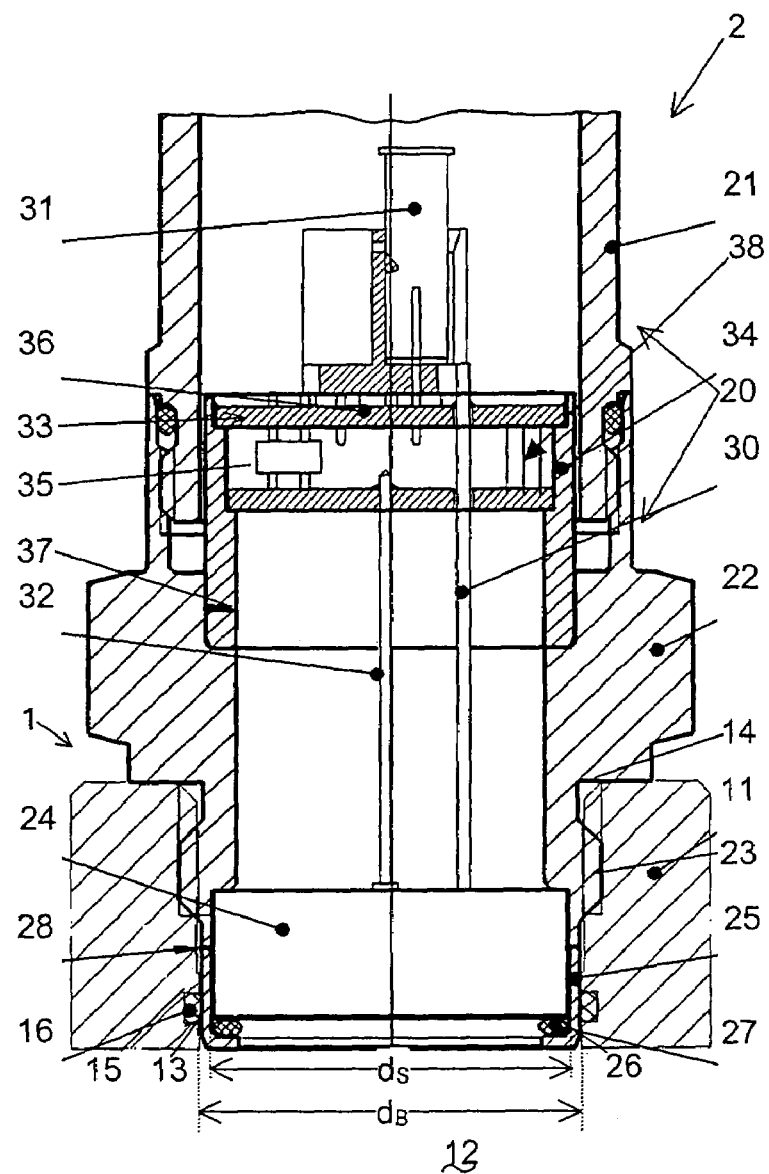

The invention relates to a sensor, specifically a pressure sensor to be fastened to a receptacle, with the features of the preamble of patent claim 1 and the features of the preamble of patent claim 7, as well as a process for mounting the sensor.

It is generally known to fasten a sensor to the wall of a receptacle in order to measure parameters relating to the receptacle contents or receptacle interior. In the paper industry, for example, pressure-measuring devices are employed as pressure sensors to determine the pressure in the interior of a receptacle.

Already known sensors in the form of pressure-measuring devices exhibit a housing with a threaded connection by means of which the housing is screwed into a receptacle through-hole, from the outside to the inside of the receptacle. Among them are pressure sensors in the form of poly-silicon pressure sensors, which are employed in conjunction with a pressure-mediating liquid, or pressure sensors which are provided with a ceramic capacitive pressure-sensor element.

The systems using poly-silicon pressure sensors have a reduced overload strength against pressure shocks, since the sensor element cannot be sufficiently supported. Furthermore, there are growing doubts about the use of such pressure sensors in connection with a pressure-mediating design with respect to the medium in the receptacle, since requirements against any possible pollution of the medium as caused by the measuring device, or its pressure-mediating fluid, are constantly increasing.

Systems with ceramic capacitive pressure-sensor elements are designed such that a fastening device is employed to install the pressure-sensor element from the outside to the inside of the receptacle, i.e., toward the process attachment, and the pressure sensor element is thus supported against the pressure effect caused by the medium under observation in the receptacle. A disadvantage in such designs rests in the fact that only those pressure-sensor elements can fit through the receptacle through-hole, and through the front hole of the sensor housing positioned in the receptacle through-hole, that have a correspondingly smaller diameter, with the result that measuring accuracy is reduced. The reduction in measuring accuracy arises from the fact that the relation of basic capacity to measuring capacity is less favorable than in is the case with larger diameters.

The goal of the invention is to propose a pressure sensor with a design which permits as large a diameter as possible for the actual sensor element serving as sensor device, in relation to the outer diameter of the front end of the sensor housing. With respect to the position of individual sensor components inside the housing, an improved arrangement is also proposed, one which permits the overall dimensions of the housing to be smaller in size. The procedure for manufacturing such sensors is advantageously proposed.

This goal is achieved with a pressure sensor with the features of patent claim 1 and with a pressure sensor of independent inventive design exhibiting the features of patent claim 7. Advantageous procedures for producing such sensors are the subject matter of patent claims 9 and 12.

A pressure sensor will advantageously consist of a housing with a longitudinal axis, a front-end sensor device, which in assembled condition projects into a receptacle through-hole, and a sensor-fastening device for securing the sensor device onto, or in, the housing. In order to make possible a space-saving design, the sensor-fastening device encompasses the sensor device from the front end, at least in sections of the front-end rim area of the sensor device, thus providing the latter with front-end support. The sensor-fastening device will advantageously merge with the housing by means of a fastening, without any enlargement of the external circumference. An appropriate fastening would be a joint, particularly a thermal joint.

In the back end area of the sensor device an outer thread is formed on a circumferential wall of the housing in order to secure the housing in an inner thread of a receptacle through-hole. It is expedient for the outer circumference of the sensor-fastening device to be smaller than or equal to the core diameter of the thread, thereby making it possible to almost entirely utilize the diameter of the receptacle through-hole with respect to the outer diameter of the sensor device. The area of the sensor device that can be effectively utilized is limited only by the walls of the sensor-fastening device running along the side of the sensor device and by the encompassing mounting elements on the front end.

In accordance with the invention process the sensor device will be advantageously positioned on and attached to the housing (or, as the case may be, to other components located within the housing) from the front end; to secure the housing from the front end the sensor-fastening device will be slipped over and secured to the housing. Attachment will be expediently performed with a joint, and it is advantageous to employ as a little as possible thermal energy and to employ electromagnetic fields that are as small as possible in order to fuse together the metal parts of the sensor-fastening device and the housing. This prevents the destruction of the pressure sensor element, which is made of ceramic material, as well as elastomer sealings that directly border the sensor.

In a particularly preferred and advantageous dimensional design, this kind of arrangement or process makes it possible to produce a sensor in which the outer diameter of the sensor device is only slightly smaller than the core diameter of an outer thread of a sensor housing fastening device. Here it is possible to achieve a ratio between of the outer diameter of the sensor device—ideally a standard pressure-sensor element—and the standard thread core diameter such as to provide the smallest possible spacing between the two elements and to provide a sensor-fastening device with a wall thickness that is half the difference between the two diameters. For example, 28 mm is a typical outer diameter for a pressure sensor element, where this kind of sensor element in the arrangement described can be employed on a sensor housing and there is a core diameter of 30.28 mm for a typical borehole serving as receptacle through-hole, or for a corresponding housing-fastening device in the form of an outer thread. In this example the ratio of the outer diameter of the sensor device, or sensor element, to the core diameter of the thread used for securing the sensor in a receptacle through-hole is 90% or more, specifically 92.4%.

To reduce the number and size of components and ultimately the size of the entire sensor it is proposed—as an independent inventive design—that the material of a module housing, e.g., an electronics housing with a solderable layer or surface, be so designed that through squeezing, specifically squeezing with a fastening element or with a some other element, the solderable layer will be partially dispersed and displaced and that after the latter has solidified an electrical contact will be formed for the protection of the electronic equipment against electromagnetic influences and/or to assure the adjustment of potential. This makes it unnecessary to provide separate contacts, attachments, and connecting elements.

Advantageous elaborations are the subject matter of the dependent claims.

An exemplary embodiment is next described in greater detail on the basis of the drawing. The single FIGURE shows:

FIG. 1 an at least partial cross-section through a sensor, which is screwed into a receptacle through-hole FIG. 1 shows the section of a receptacle 1, to which a sensor 2 is secured, specifically in a manner that allows it to be detached. The receptacle 1 exhibits a wall 11, although the depicted section can also be designed as, e.g., a flange, or other screw-in fastening means, as an element belonging to the receptacle 1.

Running through the wall 11 from the receptacle interior 12 to the outside is a receptacle through-hole 13. In the direction of the outside of the receptacle 1 the receptacle through-hole 13 exhibits a receptacle inner thread 14, which allows the sensor 2 to be screwed in it. To seal the inserted sensor 2 the inside of the receptacle through-hole 13 also exhibits a circumferential receptacle groove 15, into which an elastic seal, e.g., an O-ring 16, is inserted, so that no medium can run to the outside from the receptacle interior 12 through the intermediate space between the receptacle through-hole 13 and the inserted sensor 2.

The sensor 2 consists of a housing 20, which in the depicted exemplary embodiment is composed of a plurality of individual components. The depicted housing 20 exhibits a back end housing part 21 and a front end housing part 22. Here front end refers to the end, or to the direction of structural elements, pointing toward the receptacle interior 12 and back end refers to the opposite direction, when the configuration is in assembled condition. The directional indications serve merely to provide a more graphic description of the individual components and their mutual orientation. In the lateral circumferential area of the forward section of the front end housing part 22, 20 there is a housing-fastening device 23 in the form of an outer thread 23. By means of this outer thread 23 the sensor 2 is screwed into the inner thread 14 of the receptacle through-hole 13, to thereby fasten the sensor 2 to the receptacle 1.

The actual sensor device 24, specifically a ceramic pressure sensor element 24, is positioned on the face or front end of the forward housing part 22, 20, specifically in a mounting recess. Serving to fasten the sensor device 24 is a sensor-fastening device 25, which is basically circular in shape and which encompasses the sensor device 24 laterally, proceeding from the face of the front end housing part 22, 20 and reaching to the forward side of the sensor device 24. The thickness of the sensor-fastening device 25 is kept as thin as possible, both to provide the sensor device 24 with a secure hold on the housing 20, 22 and to allow the diameter $d_S$ of the sensor device 24 to be as close in size to the larger inner diameter $d_B$ of the receptacle through-hole 13. This makes it possible to use a sensor device 24 with an optimally large diameter $d_S$, and this ultimately counteracts the customary loss in measuring accuracy and increases the measuring capacity.

In order to hold the sensor device 24 on the housing 20, 22 and in the receptacle through-hole 13 the sensor-fastening device 25 exhibits one or a plurality of protrusions 26 projecting or pointing inwardly. In the depicted embodiment this inwardly directed protrusion 26 takes the form of a bent-back circumferential collar 26 belonging to the otherwise cylindrical or circular sensor-fastening device 25. In order to make it possible to seal the receptacle interior 12 against the inside of the housing 20, 22 and also to protect the front end surface of the sensor device 24 from mechanical damage, one or a plurality of seals 27, ideally a circumferential sealing ring 27, is inserted between the inwardly pointing projection 26 and the front end of the sensor device 24.

To secure the sensor-fastening device 25 to the front section of the forward housing part 22, 20 a joint-like connection 28 is formed. The joint 28 between the housing ring serving as sensor-fastening device 25 and the front end housing part 22, 20 is composed with so little thermal energy, e.g., light waves, that the two parts fuse together without destruction of the sensor device 24, specifically the ceramic pressure-sensor element, and without destruction of the directly bordering elastomer seal 27, and also with so little thermal energy that electromagnetic fields that could destroy a sensor electronic unit attached to the sensor 2 do not arise. Correspondingly the elements 25, 22 to be joined will ideally be metal parts which are fused together using thermal energy in the form of light waves. It is also possible to use other materials, along with appropriate processes for fusing those materials or for connecting them by means of adhesive substances.

This manner of securing the sensor device 24 to the housing 20, or alternately of securing a sensor-fastening device to fasten the sensor to the receptacle 1 without other depicted components, provides not only a simple assembly process but also provides spatial advantages with respect to the usable surface area of the sensor device 24. For example, in this arrangement a standard ceramic capacitive pressure sensor element with a diameter of, e.g., 28 mm can be attached. Here a core diameter for a conventional thread G1 (in accordance with DIN ISO 228-1) of 30.29 mm for the housing outer thread 23 or, as the case may be, for the receptacle inner thread 14 in the receptacle through-hole 13 can be provided. For the sensor-fastening device 25 there remains a sufficient wall thickness of 1–1.14 mm for encompassing the sensor device 24. Nonetheless the wall that belongs to the front end housing part 22 and is formed on the back end of the sensor device 24 exhibits a sufficient thickness in the area of the receptacle inner thread 14 to provide adequate stability and support for the sensor 2. This is ultimately made possible by the fact that the pressure sensor element is inserted into the fastening, or the front end housing part 22, 20, starting with its process end, and is supported by said housing part 22, 20 in the outward direction. Here the pressure sensor element 24 is held in place by the joined housing ring serving as sensor-fastening device 25 and exhibiting a specific outer diameter of 30 mm, and is held in place by the seal 27.

In the depicted exemplary embodiment a pressure equalization line 30 leads from the sensor device 24 through the interior of the housing 20 and through other components, specifically the sensor electronics unit 33, in order to insure air equalization for the pressure sensor element, a process which in itself is known to the prior art.

In addition, one or a plurality of lines in the form of electrical connections 32 run from the sensor device 24 to the sensor electronic unit 33, which is received in an electronics housing 34 inside the housing 20–22. The electrical connections 32 here lead to an initial circuit board 35 and from there to corresponding strip conductors and/or electronic components. In the depicted exemplary embodiment the connection to a second circuit board 36, which is positioned at a distance from the first circuit board 35 and is located in the electronics housing 34, occurs via connections between the first and the second circuit boards 35, 36 and/or via the electronics housing 34 per se.

The electronic connection between the two circuit boards 35 and 36 can, as mentioned, take place via the electronics housing 34. To this end, a necessary number of mutually insulated strip conductors are expediently applied to the inner wall of the electronics housing 34. These strip conductors, which are indicated by reference numeral 38 in FIG. 1, can be provided with electrical contacts that are positioned on the rims of circuit boards 35 and 36, e.g., sliding contacts. In this way an electrical connection is insured between the upper plate 36 and the lower plate 35. In this kind embodiment a separate plug connection can be omitted.

To insure an optimal electromagnetic shield for the sensor device 24 and the sensor electronics unit 33 a solderable material is inserted between the lower face of the electronics housing 34 and a step-shaped projection on the front end housing part 22. Since the sensor module housing 34 and the housing 22 consist of metal, pressing the two parts together with sufficient force will allow the solderable material 37 to create a solidified, electrically conductive connection between the module housing 34 and the front housing part 22. In this way an existing joint is sealed between the module housing 34 and the front housing part 22.

For this kind of conductive pressure connection the electronics housing does not necessarily have to be made entirely of metal. It is enough if the electronics housing 34 and the front end housing part 22 exhibit at least a solderable material or a solderable layer on the outside surface. By pressing together the electronics housing 34 and the front end housing part 22—if necessary, with accompanying heating of the solderable materials—the two will become attached, while excess solderable material is forced aside. After squeezing the elements together, particularly after compression and cooling, a solid, electrically conductive connection is formed.

The inside of the housing 20, or the front end housing part 22, or any other fastening device with a thread attachment for the sensor device 24 are protected against contamination by penetrating material coming from the receptacle interior 12 by the seal 27 at the weldable or welded-on sensor fastening device 25, 26. As a result, contaminants cannot penetrate into the interior of the remaining part of the housing 20, since the circumferential seal 27 already seals the housing ring, which constitutes the sensor-fastening device 25, and the sensor device 24.

The depicted exemplary embodiment can be modified in many different ways. For example, the wall 11 is designed as a wall between the front end (viewed from the sensor) receptacle interior 12 and the outside of the receptacle 1. Naturally the opposite arrangement is also possible, in which the front end of the sensor 2, with the sensor device 24, is directed out of a receptacle into an externally open environment.

LIST OF REFERENCE NUMERALS 1 receptacle
11 wall of receptacle
12 receptacle interior
13 receptacle through-hole
14 receptacle inner thread
15 receptacle groove
16 seal (receptacle/sensor)
2 sensor
20 housing
21 back-end housing part
22 front-end housing part
23 housing-fastening device (outer thread)
24 sensor device/pressure sensor element
25 sensor-device fastening element
26 inwardly pointing projection
27 seal (24 to 25)
28 joint
$d_S$ diameter of sensor device 24
$d_B$ core diameter of inner thread 14
30 pressure equalization line
31 spring housing
32 electrical connections
33 sensor electronics
34 electronics housing
35 first circuit board
36 second circuit board
37 contact
38 strip conductor

The invention claimed is:

1. A sensor (2) comprising:
a housing (20) having a back-end part (21) and a front-end part (22),
a sensor device (24),
a sensor-fastening device (25) for fastening the sensor device (24) at least one of to and in the front-end part (22) of the housing (20), and
a joint (28) for securing the sensor-fastening device (25) to the front-end part (22) of the housing (20),
wherein the sensor-fastening device (25) encompasses and provides support to the sensor device (24) from the front-end part (22) outwards to a forward side of the sensor device (24), at least in one section of a front end rim area.

2. A sensor according to claim 1, in which a thread (23) serving as a housing-fastening device is formed on the circumferential wall of the housing (20) in the back-end part (21) of the housing (20), relative to the sensor device (24).

3. A sensor according to claim 2, in which the outer circumference of the sensor-fastening device (25) is smaller than or equal to the core diameter ($d_B$) of the thread (23).

4. A sensor according to claim 1, in which the joint (28) is a thermal fusion joint.

5. A sensor according to claim 1, in which a seal (27) between the sensor device (24) and the sensor-fastening device (25) seals a front end space in front of the sensor device (24) from the interior of the housing (20).

6. A sensor (2) according to claim 1, with
a housing (20) for receiving a sensor device (24),
a module housing (34), and
at least one electrical connection (32) between the front-end part (22) of the housing (20) and the module housing (34) and being connected thereto,
wherein at least one of a section (37) of the module housing (34) and the front-end part (22) of the housing (20) in the area in which they are connected consists of a solderable material, at least on the surface, and forms a solidified, electrically conductive pressure connection.

7. A fastening arrangement for a pressure sensor (2) according to claim 1, with
a wall (11) belonging to receptacle (1),
a receptacle through-hole (13) running through the wall (11) from a receptacle interior (12) to the outside of the receptacle (1),
a housing (20) for the sensor (2),
a sensor device (24) in a front-end part (22) of the housing (20) for determining a measuring magnitude, a housing-fastening device (23) for fastening the housing (20) in the area of the receptacle through-hole (13), and a sensor-fastening device (25) for fastening the sensor device (24) on or in the front-end part (22) of the housing (20) wherein the housing-fastening device (23) in assembled condition is fastened, by being screwed, into the receptacle through-hole (13), and the sensor-fastening device (25) encompasses and supports the sensor device (24) from the front end, from the receptacle intetior (12) outwards, and inside of the receptacle through-hole (13) is fastened to the housing-fastening device (23).

8. A process for mounting a sensor (2), comprising:

positioning a sensor device (24) on the front end of a housing (20), encompassing the sensor device (24) by a sensor-fastening device (25), such that a forward side of the sensor device (24) is pressed against the front end of the housing (20), where the sensor-fastening device (25) exhibits at least one projection (26) which is directed inwardly and exhibits at least one circumferential wall which extends along the sensor device (24) up to the front end of the housing (20), and the sensor-fastening device (25) is fastened to a front end of the housing (20) with a solid and sealed joint (28).

9. A process according to claim 8, in which the joint (28) is thermally formed, such that the energy is kept sufficiently small for the sensor device (24), which consists of ceramic material, such that the sensor device (24) is not thermally damaged.

10. A process according to claim 8, in which the joint is (28) formed so as to be free of electromagnetic fields, such that electronic components of the sensor (2) are not damaged.

11. A process for mounting a sensor (2) and fastening a module housing (34) to a section of another housing part (22), in a sensor (2) according to claim 6, wherein one of the module housing (34) and the front-end part (22) of the housing (22) exhibit at least one surface consisting of solderable material, and the module housing (34) and the front-end part (22) of the housing (20) are pressed together in activation of the material, in order to dissolve the solderable material when the two parts are fastened and form an electrical contact, and in order to firmly connect the elements that have been pressed together, after the material solidifies.

12. A sensor according to claim 3, wherein an outer diameter ($d_S$) of the sensor device (24) is only slightly smaller than the core diameter ($d_B$) of an outer thread (14) of the housing-fastening device (23).

13. A sensor (2) according to claim 12, wherein a ratio of the outer diameter ($d_S$) of the sensor device (24), which takes the form of a standard pressure sensor element, to that of the standard thread core diameters ($d_B$) is exhibited such that the spacing between the two components is as small as possible, and wherein the sensor-fastening device (25), whose wall thickness is $((d_B-d_S)/2)$, is half the difference between the two diameters.

14. A sensor (2) according to claim 1, wherein an outer diameter ($d_S$) of the sensor device (24) is at least betwen 90% and 92.4% of the core diameter ($d_B$) of the housing-fastening device (23) adjacent to the sensor device (24).

15. A sensor produced by a process for mounting a sensor, the process including:

positioning a sensor device on a front end of a housing, encompassing the sensor device by a sensor-fastening device and pressing a forward side of the sensor device against the front end of the housing;

wherein the sensor-fastening device exhibits at least one projection which is directed inwardly and exhibits at least on circumferential wall which extends along the sensor device up to the front end of the housing, and the sensor-fastening device is fastened to the front end of the housing with a solid and sealed joint, and in which an outer diameter of the sensor device is only slightly smaller than the core diameter of an outer thread of a sensor-housing-fastening device.

* * * * *